US009228523B2

(12) United States Patent
Varney

(10) Patent No.: US 9,228,523 B2
(45) Date of Patent: Jan. 5, 2016

(54) ENGINE AIR TO FUEL RATIO CYLINDER IMBALANCE DIAGNOSTIC

(75) Inventor: Brian Varney, Southam (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 242 days.

(21) Appl. No.: 14/114,048

(22) PCT Filed: Apr. 25, 2012

(86) PCT No.: PCT/EP2012/057572
§ 371 (c)(1), (2), (4) Date: Jan. 4, 2014

(87) PCT Pub. No.: WO2012/146620
PCT Pub. Date: Nov. 1, 2012

(65) Prior Publication Data

US 2014/0123943 A1 May 8, 2014

(30) Foreign Application Priority Data

Apr. 28, 2011 (GB) .................................. 1107145.3

(51) Int. Cl.

| | |
|---|---|
| ***B60T 7/12*** | (2006.01) |
| ***F02D 41/24*** | (2006.01) |
| ***F02D 41/00*** | (2006.01) |
| ***F02D 41/14*** | (2006.01) |
| ***F02D 41/18*** | (2006.01) |

(52) U.S. Cl.
CPC ............ *F02D 41/24* (2013.01); *F02D 41/0085* (2013.01); *F02D 41/1441* (2013.01); *F02D 41/1454* (2013.01); *F02D 41/18* (2013.01); *F02D 41/2454* (2013.01)

(58) Field of Classification Search
CPC ..... F02D 41/00; F02D 41/0002; F01D 41/18; F01D 41/1458; F01D 41/1454
USPC .......... 701/103, 105, 109, 114; 123/434, 435, 123/436, 672–674, 679, 680, 681, 687, 695
See application file for complete search history.

(56) References Cited

U.S. PATENT DOCUMENTS

| | | | | |
|---|---|---|---|---|
| 4,483,300 | A | 11/1984 | Hosaka et al. | |
| 6,102,018 | A * | 8/2000 | Kerns ................. | F02D 41/0042 123/674 |
| 6,148,808 | A | 11/2000 | Kainz | |
| 6,308,697 | B1 * | 10/2001 | Surnilla ............... | F01N 3/0842 123/672 |

(Continued)

FOREIGN PATENT DOCUMENTS

| | | | |
|---|---|---|---|
| WO | WO2009013600 | A2 | 1/2009 |
| WO | WO2011024324 | A1 | 3/2011 |

OTHER PUBLICATIONS

International Search Report for PCT/EP2012/057572 dated Sep. 4, 2012, 3 pages.

*Primary Examiner* — John Kwon
(74) *Attorney, Agent, or Firm* — Reising Ethington P.C.

(57) ABSTRACT

A diagnostic for identifying cylinder to cylinder air/fuel ratio faults of an engine having closed loop fuel control. Air mass flow is accumulated for a plurality of load bands on the engine load/speed map, and for each load band a rich/lean air fuel ratio is determined at a mass threshold. This threshold data is processed and compared with fixed data to determine whether any cylinder of an engine is experiencing an air/fuel ratio fault which is substantially different to the remainder.

13 Claims, 3 Drawing Sheets

(56) References Cited

U.S. PATENT DOCUMENTS 6,487,850 B1 * 12/2002 Bidner .................. F01N 3/0807 60/274
2002/0152741 A1 * 10/2002 Bidner .................. F01N 3/0842 60/274
2004/0187482 A1 * 9/2004 Bidner .................. F01N 3/0807 60/285

* cited by examiner

ENGINE AIR TO FUEL RATIO CYLINDER IMBALANCE DIAGNOSTIC

The present invention relates to a diagnostic for an internal combustion engine, particularly a gasoline engine having closed loop fuel control. Aspects of the invention relate to a method, a control unit and a vehicle.

Exhaust emissions legislation requires that harmful emissions from internal combustion engines be minimized. In a gasoline engine, control systems typically attempt to maintain stoichiometric combustion, and for this purpose one or more oxygen sensors are provided in the exhaust tract for determining whether the air/fuel ratio of the engine is rich or lean. The usual electronic engine control unit (ECU) uses the output of the oxygen sensor in real time to continuously adjust fuelling by closed loop feedback control. Such an arrangement allows much better control of fuelling/emissions than an open loop fuel map, and has become universal.

Emissions legislation has imposed more stringent limits over time, and accordingly more sophisticated engine control systems have been developed.

In one example a vehicle engine has two exhaust oxygen sensors. An upstream oxygen sensor close to the engine has the capability of detecting a wide range of air/fuel ratios, but may have comparatively poor accuracy. A second oxygen sensor downstream of the first sensor has narrow range capability, but comparatively high accuracy. Two sensors are provided because; by appropriate combination of their characteristics it is possible to provide very accurate control over a wide range of air/fuel ratios. Other factors influence sensor selection and placement, and are not further discussed here.

When the engine is operating in closed loop fuelling control using the output of the comparatively inaccurate wide band upstream sensor, an assessment can be made of the output from the more accurate narrow band downstream sensor. This output can then be used to determine a measure of the accuracy with which the upstream sensor is controlling the air/fuel ratio of the exhaust gases, and a correction (or "bias") may then be applied to the closed loop fuelling system to improve the accuracy of control so as to better control unwanted exhaust emissions.

However this "bias" will also reflect the sum of other inaccuracies in the closed loop fuelling control of the engine; the most significant of which may be exhaust air leakage, and cylinder to cylinder air/fuel ratio asymmetry.

Significant cylinder to cylinder air/fuel ratio asymmetry can potentially be caused by the complete or partial failure of any cylinder specific fuel or air control features (e.g. as a result of fuel injector contamination or because of inlet/exhaust valve leakage) and will cause a heterogeneous air/fuel mixture to be delivered to the exhaust system.

The upstream oxygen sensor can only appreciate the oxygen content of the mixture which flows immediately past the head of the sensor and in a heterogeneous flow this portion of the mixture may not represent the mean air/fuel ratio of the entire flow. However as the flow passes further down the exhaust it will become better mixed and the mixture which passes about the head of the second sensor will be more representative of the mean air/fuel ratio causing a difference (or "bias") in perceived air/fuel ratio to exist between the two sensors.

Subsequently by comparison of this "bias" against a predetermined threshold level, a method can be developed to determine that the engine has a cylinder to cylinder air to fuel ratio imbalance fault, and the driver may in consequence be alerted by the illumination of a warning lamp. The provision of such a method (which can determine whether an engine has a fault which may increase exhaust emissions) is a legislative requirement in many automotive markets.

Thus, typically, the effect of cylinder specific asymmetry is determined on a test bed by deliberate introduction of faults, and thus data is used to determine thresholds against which real time engine performance can be compared. A bias of 1% may for example be considered normal; whereas a bias of 3% may indicate an imbalance fault. Thresholds may be set for many conditions of an engine operating load/speed map, dependent upon the test bed data.

However as previously described the primary purpose of applying a "bias" to the closed loop fuelling system, is to ensure the most accurate possible control of the air/fuel ratio concentration in the mixture presented to the exhaust catalyst system; and thus ensure optimum treatment of exhaust emissions. This arrangement is not designed for use as an engine fault detection device; and some characteristics of the way in which this "bias" is determined and applied may make it less than ideal for this additional purpose. These characteristics may include the requirement that the "bias" can change only very slowly over time and/or can change only when operating at a tightly controlled engine speed/load condition.

One strategy for providing a more sensitive method for detecting cylinder to cylinder air/fuel ratio asymmetry faults is to locate an optimum region of the engine operating load/speed map in which the difference between the two sensors is normally most marked, and to carry out an appropriate assessment of the output from the second sensor against a threshold defined for that region only. In other areas of the load/speed map, the difference between the two sensors may not be sufficiently large to be reliably detected, or may not be different at all.

The narrow band of operation of the downstream sensor means that the output can be considered to be binary in nature, i.e. the mixture can be thought of as holding only one of two states; it can be considered as being either rich or lean.

Considering such a binary output; one means of making an assessment (appropriate for use as a cylinder to cylinder air/fuel ratio asymmetry fault detection device) might be to consider the duration of the period for which the sensor is either lean or rich. If the applied "bias" at the engine speed/load condition being experienced is entirely appropriate for that condition, then the period for which the sensor returns a rich output will be balanced relative to the period for which it returns a lean output. If the "bias" is inappropriate then the duration of the period for which the sensor returns one of the two specific values may be substantially greater than that for which it returns the opposing value. The absolute value of the bias may vary according to the operating condition of the engine on the load/speed map.

The duration of these two periods (rich/lean) may be measured by integrated air flow. Assessments of these two periods relative to one another or each relative to defined thresholds may then be used determine whether a cylinder to cylinder air/fuel ratio asymmetry fault exists.

Thus in this strategy the engine operating (speed and load) conditions may be compared against a load/speed grid, and checks of the duration of these periods relative to predetermined thresholds may take place only when the engine is operating in the optimum region of the grid—for example in the single cell corresponding to a load range of 60-80%, and an engine speed in the range 20-30%.

The location and range of the optimum cell will typically vary between differing engine manufacturers and engine types. However this solution may not be appropriate if a cell cannot be identified in which the bias is most marked for all different potential failure mechanisms. Also if the vehicle engine is never operated in the selected load/speed cell, for example due to the driving style of the vehicle driver, the selected cell solution may not work at all.

Accordingly a better method and means of reliably identifying a cylinder to cylinder air/fuel ratio asymmetry fault is required.

According to one aspect of the invention there is provided a method of identifying cylinder to cylinder air/fuel ratio asymmetry of a gasoline multi-cylinder internal combustion engine having an upstream exhaust gas oxygen sensor and a downstream exhaust gas oxygen sensor, the method comprising the steps of:

- selecting a plurality of successive load bands on the engine load/speed map;
- determining the outputs of said downstream sensor as lean or rich;
- for each load band, recording in a respective register a measure of air flow whilst the downstream sensor output indicates lean, and whilst the downstream sensor output indicates rich;
- for each load band determining a cumulative measure of air flow, and at a threshold determining the lean/rich air flow ratio, and a predicted error from said air flow ratio;
- determining for each load band an average difference in the air/fuel ratio indicated by the outputs of upstream and downstream oxygen sensors;
- combining said predicted error with said difference to obtain a predicted difference; and
- comparing said predicted difference against pass/fail criteria.

The number of load bands may be selected according to the sophistication required, but typically three to six load bands provide a reasonable compromise. The load band range may have lower and upper limits outside which measurements are not used in the method of the invention. The load band range may be between 10 and 90%, and each load band may be of equal range, for example 5 bands each having a spread of 16%. The number of bands, and respective range will be selected according to the engine to which the method is to be applied.

In an embodiment the cumulative measures of air flow are re-set to zero once the respective threshold is reached. In the alternative a new threshold may be represented as an additional amount above a previous threshold. The respective thresholds may not be the same for each load band, and the load bands may not have the same individual spread.

A downstream sensor is more likely to be exposed to a relatively well mixed exhaust gas stream than the upstream sensor, and this circumstance contributes to the difference in air/fuel ratio which is indicated by the respective sensors.

In an embodiment two oxygen sensors are provided in the exhaust tract, one upstream of an exhaust catalyst and one downstream of at least part of an exhaust catalyst. The exhaust catalyst component is one means of promoting mixing of the exhaust gas stream.

As noted above a narrow band downstream sensor will have greater absolute accuracy than a broadband upstream sensor, and accordingly the outputs thereof can be considered either rich or lean as the closed loop fuelling control makes adjustments to engine fuelling.

The downstream sensor is selected to have an output which is characterized as only rich or lean, to permit the air flow ratio to be calculated. It is accordingly a binary device.

The measure of air flow may be volume or mass. In one embodiment the cumulative threshold for each load band is 2 kg mass; on reaching this threshold the lean/rich air flow ratio, predicted error, average difference and predicted difference for that load band is determined, and the relevant cumulative registers are preferably re-set to zero.

The engine may operate in each defined load band only momentarily, but the registers nevertheless record the respective measures of air flow.

The predicted error generated from the lean/rich air flow ratio is determined empirically according to the engine to which the method is applied, for example by deliberate introduction of fuelling faults under controlled laboratory conditions.

The predicted error may be expressed as a positive or negative value; i.e. +1% or −1%, or more simply as +1 or −1.

Certain driving styles may cause the frequency with which certain load bands are visited to be low: typically, prior art methods lose data each time the engine is turned off.

In one embodiment of the invention all cumulative values used in the calculation of lean/rich air flow ratios and average differences are retained in a suitable electrically erasable programmable (EEP) memory of an engine ECU; to ensure optimum use of all available data upon re-start of a vehicle. Thus in such an embodiment the present invention has the advantage that EEP memory may be used to hold the contents of each load band register between 'ignition off' and 'ignition on' events.

The difference or "bias" between the air/fuel ratios indicated by the outputs of the upstream and downstream sensors is used in a known control technique for determining a cylinder to cylinder fuel imbalance. The invention in at least some embodiments provides a predicted difference for predetermined load bands, which can be assessed against pass/fail criteria to better determine whether cylinder imbalance is detected.

The present invention in at least some embodiments has the advantage that data is accumulated for many load bands, not just for a particular load/speed cell, and accordingly allows better diagnosis of a wider range of different engine cylinder air/fuel ratio asymmetry faults. At least some of the embodiments also have the advantage of ensuring that optimum use is made of all engine operation data, ensuring a rapid detection of all associated fault mechanisms.

The skilled man will determine the pass/fail criteria, which may be represented as a single threshold value for each load band, for the engine to which the diagnostic is to be applied and/or by determination of the maximum differences identified between predicted bias values calculated for each load band. Again, the pass/fail criteria is typically retained in a look-up table of a suitable read only memory.

Within the scope of this application it is envisaged that the various aspects, embodiments, examples, features and alternatives set out in the preceding paragraphs, in the claims and/or in the following description and drawings may be taken independently or in any combination thereof. Features described in connection with one embodiment are applicable to all embodiments, except where there is incompatibility of features.

The present invention will now be described, by way of example only, with reference to the accompanying drawings, in which.

Figure 1:
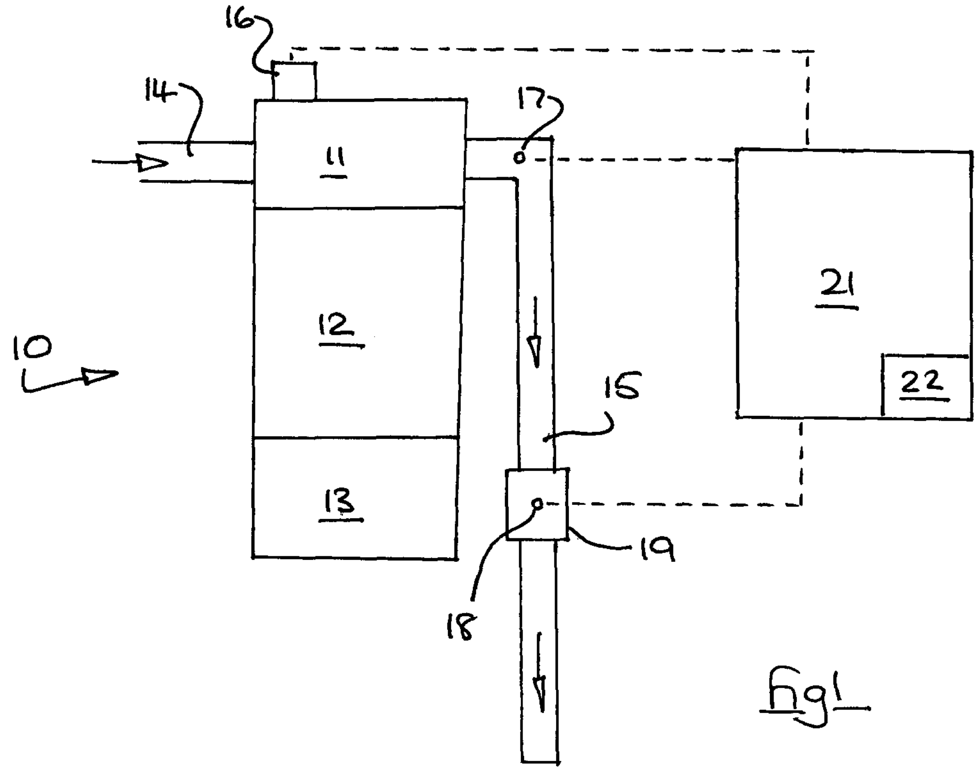
FIG. 1 is a schematic illustration of a gasoline engine and control unit.

With reference to the FIG. 1 a gasoline internal combustion (10) engine has a cylinder head (11), a cylinder block (12) and a crankcase (13). Filtered air enters via an inlet (14), and exhaust gases are conducted via an exhaust pipe (15) to atmosphere.

A high pressure fuel rail (16) is provided from which fuel is admitted to individual cylinders via respective injectors.

The exhaust pipe has an upstream oxygen sensor (17) close to the exhaust manifold, and a downstream oxygen sensor (18) within the usual catalytic converter (19). In this embodiment the downstream sensor is mid-brick. The sensors (17, 18) measure electronically the proportion of oxygen in the exhaust gas stream, from which it is possible to determine in an ECU (21) whether the air/fuel ratio is rich or lean. The ECU can then adjust fuelling at the injectors so as to maintain stoichiometric combustion, or some other desired condition. Closed loop fuelling control of this kind, using exhaust oxygen sensors, is well understood and need not be further described here.

Typically the upstream sensor has a broad detection band in the range 5-95% from fully lean to fully rich. The downstream sensor has a narrower band, in the range ±5% about the stoichiometric air/fuel ratio.

In accordance with the prior art technique, the ECU uses the outputs from the oxygen sensors to control fuelling, and may apply a 'bias' to the upstream sensor so that fuelling ensures stoichiometric combustion. In an engine in good condition, the 'bias' may for example be around 1%, whereas a fault may be indicated if the bias approaches 3%.

In the invention the load/speed map of the engine is divided into a plurality of successive bands with upper and lower limits. Data is collected for each band within which the engine operates, even if momentarily, but no data is recorded above the upper limit or below the lower limit.

Figure 2:
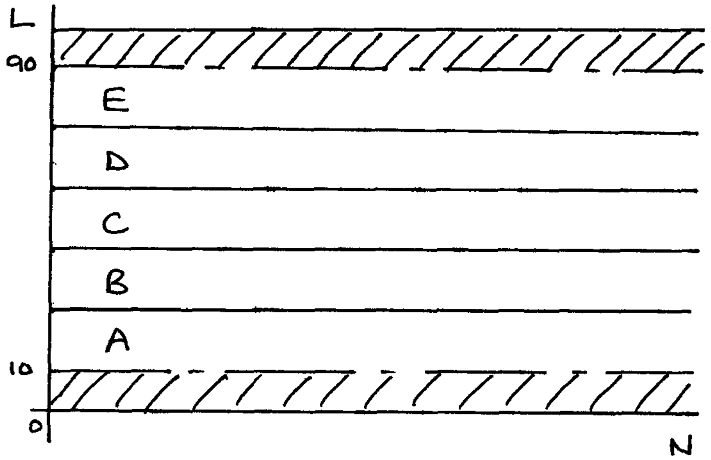
FIG. 2 shows a load/speed map with successive load bands, and upper and lower dead zones.

FIG. 2 shows an example having a lower limit of 10% load, an upper limit of 90% load, and five equal load bands A-E of 16%.

The ECU (20) is adapted to determine from the outputs of sensors (17, 18) the instant air/fuel ratio of combustion. Air mass is measured directly using a suitable sensor (not shown). In the alternative, the ECU also knows from conventional fuel flow measurement, the instant volume of fuel being admitted to the engine, and can calculate the instant volume of air being admitted to the engine. A correction for air temperature (air density) may be made if necessary.

Figure 3:
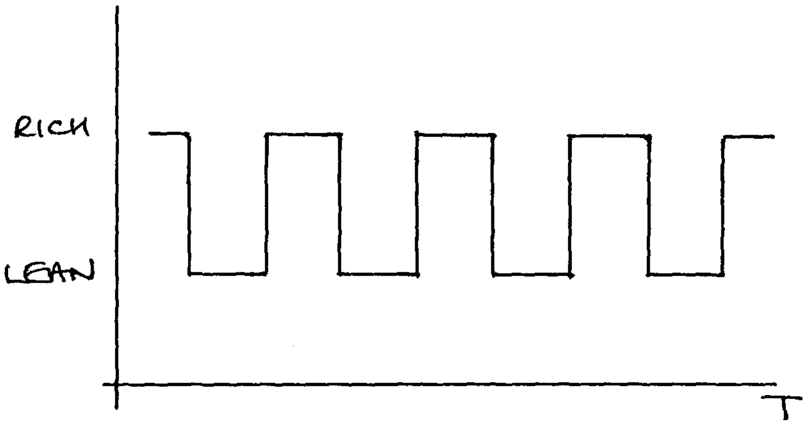
FIG. 3 illustrates a normal rich/lean output of an exhaust oxygen sensor.

The output of the downstream sensor (18) is binary, and if fuelling is well controlled, the proportion of time for which the output is indicated as rich will be near equal to the proportion for which the output is indicated as lean (FIG. 3).

Figure 4:
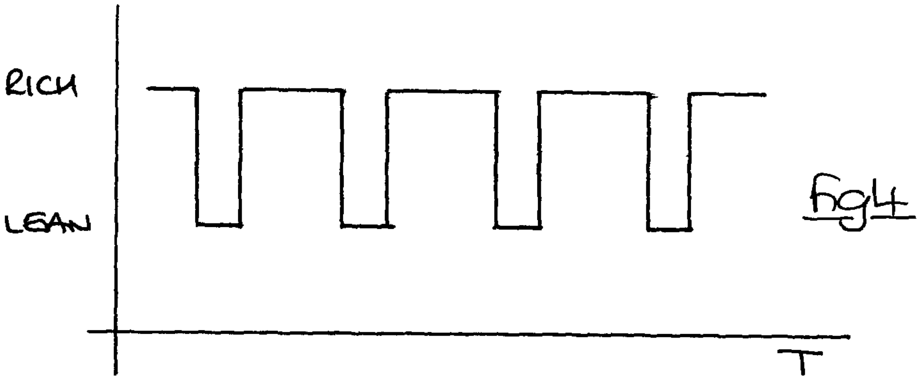
FIG. 4 illustrates an abnormal rich/lean output of an exhaust oxygen sensor.

Conversely if fuelling is not well controlled, the respective proportions of rich and lean will be markedly different (FIG. 4).

Figure 5:
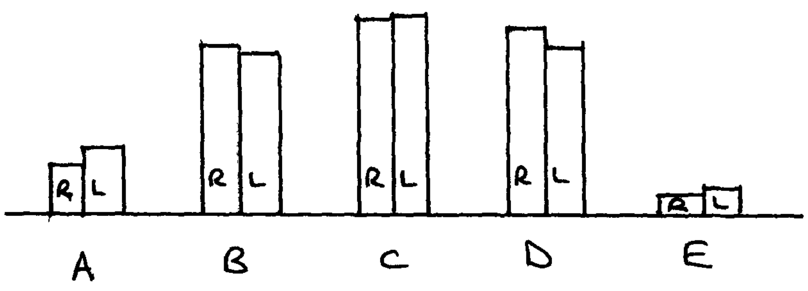
FIG. 5 illustrates cumulative rich and lean air flow in successive load bands.

In the invention, the ECU determines for each load band the mass of air associated with rich and lean, which is represented in the histogram of FIG. 5. For each load band the rich/lean ratio is close to the specified ratio (which may be 1) for an engine in good condition. Data is accumulated in a respective register for all time that the vehicle engine is operating in any load band A-E, and the sampling rate may be one second or less.

Figure 6:
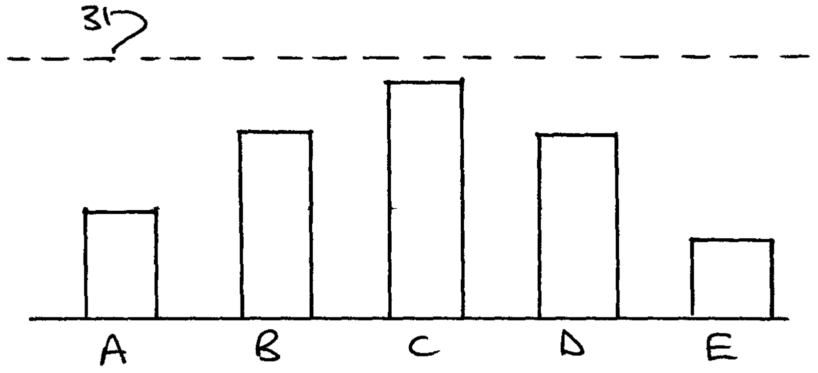
FIG. 6 illustrates cumulative air flow for successive load bands with upper threshold.

The ECU also sums the cumulative air mass flow for each load band, as represented in FIG. 6. On reaching a threshold, represented by dotted line (31), the rich/lean air ratio for the respective load band is determined, and the respective register is re-set to zero. In the example of FIG. 6, the threshold for each load band is the same, but it need not be.

Thus, for load band C it may be determined for example that the air/fuel ratio is 1% rich (or '+1') when a cumulative mass of 2 kg air has passed through the engine whilst operating in that load band.

The vehicle engine may operate in some load bands for a comparatively short time period, and accordingly a feature of the invention is that the registers maintain the cumulative mass between successive 'ignition off' and 'ignition on' events. Thus the data is retained to permit the threshold (31) to be reached, eventually.

The ECU determines a predicted error associated with the air/fuel ratio each time that a cumulative mass reaches the threshold (31). This error is obtained from a read only memory (22), or by reference to a suitable algorithm and is representative of data acquired by empirical testing of the engine to which the method of the invention is applied.

Additionally the ECU determines for each load band the average difference or 'bias' applied to correct the upstream sensor, to ensure stoichiometric combustion whilst the engine is operating in this load band.

Finally, the predicted error is combined with this average 'bias' to obtain a predicted difference or 'bias', which can be used to identify a fuel to air ratio fault in any one of several cylinders feeding into a common exhaust tract. Many ways of combining the predicted error and average bias are possible, to the intent that the predicted difference takes into account average bias in determining whether a pass/fail threshold is reached.

The predicted difference is compared with pass/fail criteria, contained for example in read only memory (22) or generated via an algorithm, so as to indicate an engine fault in any cylinder for any load band. The pass/fail criteria are determined from empirical testing and are according to selected limits within which the engine is intended to operate. The pass/fail criteria are typically numerical for direct comparison with a numerical predicted difference, typically in the range −5 to +5.

At least some embodiments of present invention have the ability to operate over the entire load/speed map of the engine, and are thus not confined to a particular region thereof. The technique of accumulating data in load band registers ensures sufficient data to give confidence in the result of the method, yet does not require frequent use of data processing resources. Typically an average time to reach a 2 kg cumulative mass threshold may be 20 min engine operation over a drive cycle including all load bands. Time to reach a threshold when operating in a single load band may be 2-3 minutes at high load, and 5-6 minutes at low load.

The method used by at least some embodiments of the invention is adaptable to different thresholds, and because data is recorded for all load bands is also suitable for many different designs of engine.

In an embodiment of the invention the sum of the predicted differences of a plurality of load bands may be compared against a threshold in order to determine if a fault condition is present. Thus one load band may indicate a difference of −1.5, and another may indicate a difference of +1.5. The range of these two errors is 3.0 which may indicate a cylinder imbalance fault.

This application claims priority from UK patent application no. GB1107145.3 filed 28 Apr. 2011, the entire contents of which are expressly incorporated by reference herein.

The invention claimed is:

1. A method of identifying cylinder to cylinder air/fuel ratio asymmetry of a multi-cylinder internal combustion engine having an upstream exhaust gas oxygen sensor and a downstream exhaust gas sensor, the method comprising the steps of:

selecting a plurality of successive load bands on an engine load/speed map;

determining the outputs of said downstream sensor as lean or rich;

for each of the load bands, recording in a respective register a measure of air flow for which the downstream sensor output indicates lean, and for which the downstream sensor output indicates rich;

for each of the load bands, determining a cumulative measure of air flow, and at a threshold determining the lean/rich air flow ratio, and a predicted error from said air flow ratio;

determining for each of the load bands an average difference in the air/fuel ratio indicated by the outputs of upstream and downstream oxygen sensors;

obtaining a predicted difference based on said predicted error and said average difference; and comparing said predicted difference against pass/fail criteria.

2. The method of claim 1, wherein a plurality of said predicted differences are combined to determine the range thereof, and said range is compared with pass/fail criteria.

3. The method of claim 1, wherein the recorded measure of air flow is mass.

4. The method of claim 1, wherein the same threshold is applied for each of the load bands.

5. The method of claim 1, wherein the content of each register is retained in EEP memory.

6. The method of claim 5, wherein the cumulative measure of air flow for each of the load bands is retained in EEP memory.

7. The method of claim 1, wherein each register is zeroed after determination of a lean/rich air flow ratio at a threshold.

8. A method according to claim 1, wherein the lowest of the load bands commences at a predetermined minimum load.

9. A method according to claim 1, wherein the highest of the load bands terminates at a predetermined termination load, and wherein the termination load is less than maximum load.

10. A method according to claim 1, wherein said load bands encompass a continuous load range.

11. A method according to claim 1, wherein each of said load bands is a substantially equal sub-division of the load range.

12. A control unit for an internal combustion engine operable in accordance with the method of claim 1.

13. A vehicle having an internal combustion engine, an electronic control unit, an upstream exhaust oxygen sensor and a downstream oxygen exhaust sensor, the electronic control unit being operable in accordance with the method of claim 1.

* * * * *